United States Patent [19]

Altman

[11] 4,216,712
[45] Aug. 12, 1980

[54] CORING APPARATUS FOR FRUIT AND THE LIKE

[76] Inventor: James E. Altman, 105 Altman Rd., Gray, Ga. 31032

[21] Appl. No.: 958,176

[22] Filed: Nov. 6, 1978

Related U.S. Application Data

[63] Continuation-in-part of Ser. No. 722,126, Sep. 10, 1976, abandoned.

[51] Int. Cl.$^2$ ............................................. A23N 4/18
[52] U.S. Cl. ...................................... 99/565; 99/544; 99/561
[58] Field of Search ................... 99/502, 504, 542–546, 99/559, 560, 561, 565

[56] References Cited

U.S. PATENT DOCUMENTS

| | | | |
|---|---|---|---|
| 1,994,114 | 3/1935 | Somers | 99/502 |
| 2,683,477 | 7/1954 | Altman | 99/544 |
| 3,351,114 | 11/1967 | Anderson | 99/544 |

*Primary Examiner*—Harvey C. Hornsby
*Assistant Examiner*—Timothy F. Simone
*Attorney, Agent, or Firm*—Hill, Van Santen, Steadman, Chiara & Simpson

[57] ABSTRACT

A tubular rotating blade assembly which can reciprocatorily cycle along the blade assembly axis. The assembly is incorporated into apparatus which sequentially functions to core a fruit member such as a grapefruit or the like after which the core member is removed from the fruit member before the blade assembly is withdrawn from such fruit member. A control means is also provided for synchronizing cycling and core removal operations of a blade assembly (or a gang of blade assemblies) relative to each of a successive plurality of fruit members to be cored.

6 Claims, 7 Drawing Figures

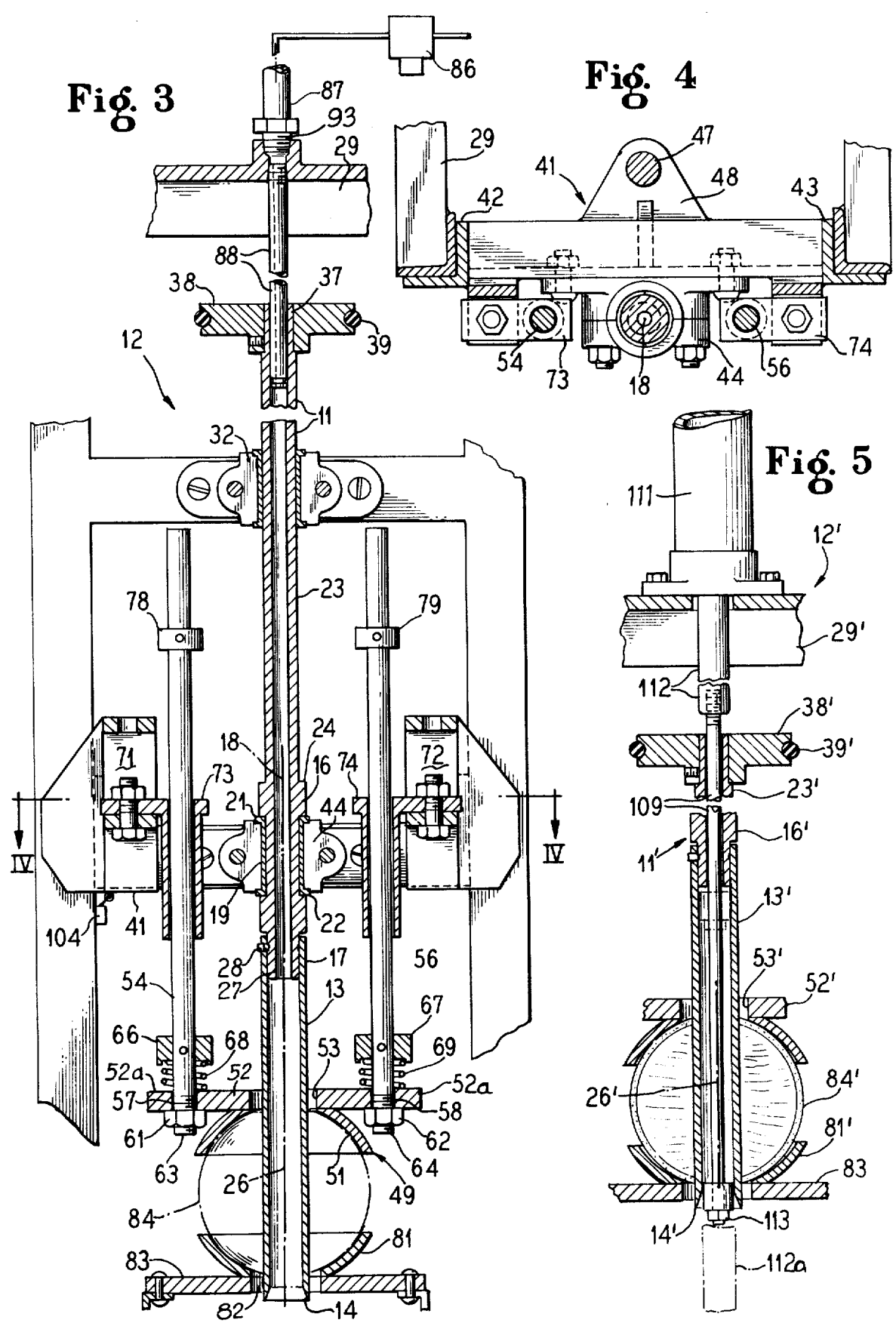

CORING APPARATUS FOR FRUIT AND THE LIKE

RELATED APPLICATION

This present application is a continuation-in-part application of application U.S. Ser. No. 722,126, filed Sept. 10, 1976, abandoned.

BACKGROUND OF THE INVENTION

In the processing of certain fruits, such as citrus fruit including grapefruit, oranges, and the like, it has heretofore been necessary to employ a great deal of hand-labor in the various operations of peeling a fruit member, coring such fruit member, and sectioning such fruit member.

So far as is now known to us, no one has heretofore succeeded in producing machinery adapted to sequentially remove cores from fruit such as grapefruit, oranges and the like in an automatic manner.

BRIEF SUMMARY OF THE INVENTION

In one aspect, the present invention is directed to a blade assembly adapted for incorporation into a coring apparatus for fruit and the like.

In another aspect, the present invention relates to power driven coring apparatus incorporating at least one blade assembly of the type above indicated.

In another aspect, the present invention relates to a process for coring a fruit member or the like followed by ejection from the blade member used for such coring of the core produced.

In another aspect, the present invention relates to a new and improved for automatically, continuously, and sequentially coring fruit members.

A primary object of the present invention is to provide a new and improved simple, reliable, effective apparatus embodying mechanism with sub-assemblies useful therein, which will avoid the necessity to use hand labor in the coring of fruit, such as grapefruit, oranges, and the like.

Other and further objects, aims, advantages, uses, purposes, and the like will be apparent to those skilled in the art from the present invention taken with the accompanying drawings.

BRIEF DESCRIPTION OF DRAWINGS

In the drawings:

FIG. 3 is a fragmentary vertical sectional view taken along the line III—III of FIG. 2, some parts thereof broken away and some parts thereof shown in section;

FIG. 4 is a transverse sectional view taken along the line IV—IV of FIG. 3, some parts thereof broken away and some parts thereof shown in section;

FIG. 5 is a fragmentary vertical sectional view similar to FIG. 3 but showing an alternative embodiment of the present invention;

DETAILED DESCRIPTION

Figure 1:
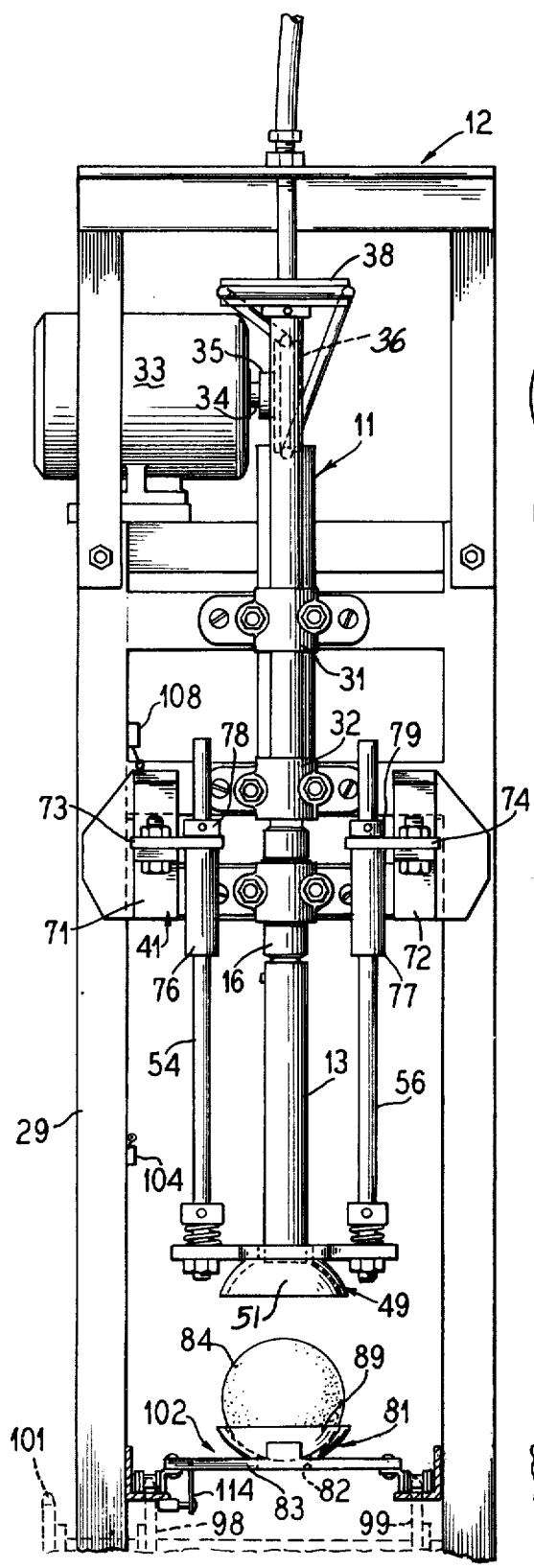
FIG. 1 is an end elevational view of one embodiment of coring apparatus of the present invention; some parts thereof broken away.

Referring first for convenience to FIGS. 1 and 4, there is seen one embodiment of a blade assembly of the present invention which is herein designated in its entirety by the numeral 11. Blade assembly 11 is adapted for incorporation into a coring apparatus herein designated in its entirety by the numeral 12. Apparatus 12 is adapted for the coring of fruit members, such as grapefruit, oranges, and the like, and for the simultaneous ejection from such apparatus 12 of cores so removed from such fruit members, as will be hereinafter explained.

Blade assembly 11 incorporates a vertical blade segment 13 in the form of an elongated tubular member with uniform, relatively thin side walls which terminate at its lower end 14 in a cross sectionally circular core cutting blade. The blade at end 14 preferably, as shown in FIG. 3, tapers to an edge from the inside walls of blade segment 13 to the outside walls thereof.

Blade assembly 11 incorporates a bearing segment 16 extending up coaxially from the upper end 17 of blade segment 13. The bearing segment 16 is in the form of a cylindrical member having a channel 18 axially defined therethrough. The central portions of bearing segment 16 on circumferentially outer surfaces thereof are provided with axially extending radially facing bearing surfaces 19 and with axially facing and horizontally extending thrust bearing surfaces 21 and 22 at opposite ends of the radial bearing surfaces 19.

The blade assembly 11 is further provided with a driving segment 23 comprising an upward extention from the upper end 24 of bearing segment 16. The driving segment 23 is in the form of a substantially elongated, tubular member, portions of whose outer circumferentially extending surfaces are adapted to serve as radial bearing surfaces.

The blade assembly 11 is provided with connection means joining the segments 13 and 16 together in a fixed, end-to-end, coaxial interrelationship along axis 26. Thus, in blade assembly 11, the lower end of the segment 16 provides a reduced diameter terminal portion 27 and adapted for mounted receipt thereover in slidable engagement therewith of the inner wall surfaces of the blade segment 13 at the upper end 17 thereof. A set screw 28 or other fastening means is employed to secure the blade segment 13 rigidly but replaceably to the terminal portion 27 of bearing segment 16. In blade assembly 11, the driving segment 23 is integrally formed with the bearing segment 16, though these members may be separately formed, if desired, and then fastened together conventionally. In use, preferably, blade assembly 11 is incorporated into apparatus, such as apparatus 11, wherein axis 26 is generally vertical.

Coring apparatus 12 incorporates a rigid upright supporting frame assembly formed of angle iron, or the like, such frame assembly being herein for convenience designated in its entirety by the numeral 29. Fixed to vertically spaced cross members of frame 29, and axially aligned with one another relative to axis 26, are a pair of axially spaced bearing assemblies 31 and 32. These bearing assemblies 31 and 32 are adapted to mount the blade assembly 11, circumferentially about outer walls of the driving segment 23, to permit rotational and reciprocal movement of the blade assembly 11 relative to the frame assembly 29 along axis 26.

For rotating the blade assembly 11, a first drive means is provided which is functionally associated with driving segment 23. In coring apparatus 12, such drive means includes an electric motor 33 which is here secured to the frame assembly 29. The shaft 34 of motor 39 has keyed thereto rotary driving means such as a pully 36. Mounted coaxially on the upper or terminal end region 37 of driving segment 23 is a driven pulley 38. Pulley 36 is connected to be driven by motor 33 about an axis of rotation which is perpendicular to the axis 26 of driving segment 23. The motor 33 and pulley 36 are so-oriented relative to the pulley 38 as to permit a drive belt 39 to be extended as a continuous loop in the circumferential grooves in the respective pulleys 38 and 36 in frictional engagement therewith, thereby operationally interconnecting the motor 33 with the driving segment 23 and permitting vertical reciprocations of the driving segment.

A carriage assembly 41 is mounted to the frame assembly 29 and is adapted to make vertical reciprocal movements relative thereto in a plane parallel to the axis 26. Thus, the opposite sides 42 and 43 of assembly 41 slidably engage spaced, vertical parallelly extending members of frame assembly 29 (see FIG. 4). Bearing surfaces 42a and 43a respectively are provided at the slidably engaging faces of frame assembly 29 and such opposed end portions 42 and 43. The carriage assembly can be constructed of ferrous metal pieces of a type similar to that employed in the frame assembly 29, if desired.

Mounted fixedly to carriage assembly 41 centrally and coaxially with respect to axis 26 is a thrust type bearing assembly 44 whose bearing surfaces are generally coaxial with axis 26. Bearing 44 mounts bearing segment 16 circumferentially about the bearing surfaces 19 and between the horizontal thrust bearing surfaces 21 and 22. Thus, while bearing 44 permits the blade assembly 11 to be rotated with respect thereto, bearing 44 is adapted to engage and to reciprocally drivably move the blade assembly 11 along the axis 26 thereof as the carriage assembly 41 slidably moves relative to the frame assembly 29.

Figure 2:
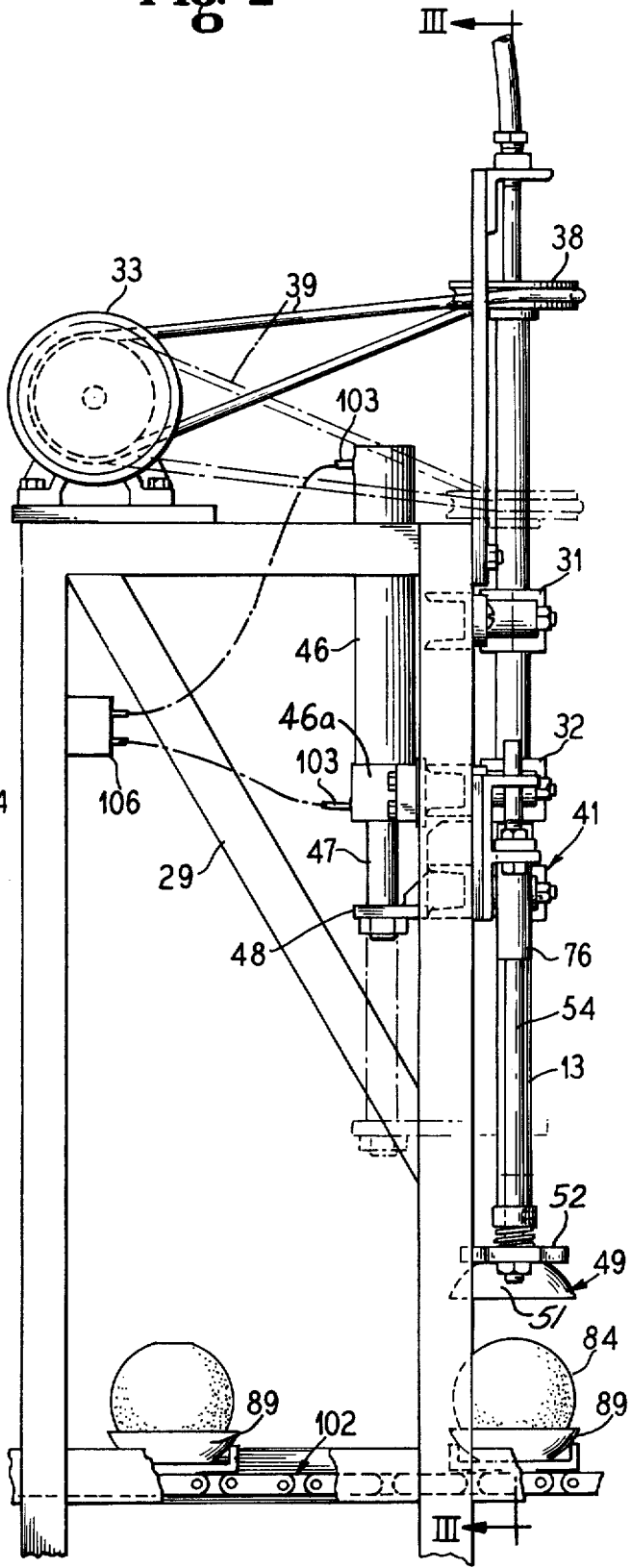
FIG. 2 is a side elevational view of the embodiment shown in FIG. 1, some parts thereof broken away.

For reciprocating the carriage assembly 41 through a cyclical range between upper and lower positions relative to the frame assembly 29, a second drive means is provided. Thus, in coring apparatus 12, the upper position is shown in FIG. 1, while the lower position is shown in FIG. 3. Here, the power head for such second drive means is provided by a preferably pneumatic cylinder rectilinear actuator assembly 46 having a reciprocatable piston rod or shaft 47. Cylinder 46 mounted in fixed position on the frame 29 as by bracket means 46a (FIG. 2) and is preferably of the double acting piston type so that shaft 47 may be driven by the piston (not shown) in the cylinder upwardly and downwardly, respectively, in resect to apparatus 12. The forward end of shaft 47 is secured to a flange 48 centrally outwardly projecting from the back side of carriage assembly 41. The pneumatic cylinder 46 is preferably spatially oriented so as to permit the shaft 47 to have its axis approach nearly a parallel relationship spaced from the axis 26. Thus, reciprocal driven movements of shaft 47 produces sliding up and down movement of the carriage assembly 41 cyclically between the upper and lower positions.

A fruit hold down assembly 49 is provided which has a central, downwardly facing internally concavely shaped semispherical segment 51. The inner surface radius of curvature of segment 51 is adapted to mate generally with the radius of curvature of a fruit member of a predetermined class, such as a grapefruit, orange, or the like. The segment 51 is fixedly carried by a horizontally oriented base plate 52 which has oppositely laterally outwardly extending arms 52a at the upper end of segment 51 in the apparatus 12. Extending radially through the segment 51 and centrally through the base 52 is an aperture 53 whose diameter is great enough to permit the segment 51 to be positioned around blade segment 13 in spaced clearance relationship to wall portions of the blade segment 13. Holding the segment 51 in such a relationship to the blade segment 13 are a pair of vertically, upwardly extending guide rods 54 and 56. Rods 54 and 56 extend in parallel, spaced relationship to one another to and between the arms 52a of the base plate 52 and the carriage assembly 41.

The lower end 63 and 64 of each respective rod 54 and 56 extends through an aperture 58 and 59 formed in the arms of the plate 52 to leave the plate 52 adapted for slidable movement relative to and along the rods 54 and 56. Downward travel of the plate 52 relative to each rod 54 is limited by nuts 61 and 62 which respectively threadably engage each rod 54 and 56 adjacent the respective end 63 and 64 thereof. In spaced relationship to respective rod ends 63 and 64 and circumferentially about each rod 54 and 56 is secured (as by a set screw) a collar 66 and 67, respectively. Between each of the respective collars 66 and 67 and base plate 52, and circumferentially about each rod 54 and 56, a coiled biasing spring 68 and 69 is located. By this arrangement, some yielding, spring biased movement of plate 52 relative to rods 54 and 56 is achieved as is optionally desirable in an embodiment of this invention to achieve some accomodation between variously sized fruit members and fruit holder assembly 49, such as is to be expected under normal operating conditions for a coring apparatus as those skilled in the art will appreciate.

Each of the rods 54 and 56 is slidably suspended from the carriage assembly 41 at the respective upper end portions of rods 54 and 56. Thus, in spaced, aligned parallel relationship with one another a pair of F-shaped brackets 71 and 72 are secured by welding or the like to carriage assembly 41. The lower leg of each bracket 71 and 72 has herein mounted thereto a hanger 73 and 74, respectively, and from each hanger 73 and 74 is extended a guide sleeve 76 and 77, respectively. Each guide sleeve 76 and 77 is adapted to slidably retain and guide a guide rod 54 and 56 respectively for axial sliding movements of these rods 54 and 56 relative to the guides 76 and 77, respectively. These rods 54 and 56 are limited in the extent of their travel downwardly relative to apparatus 12 by a pair of retaining collars 78 and 79, one such collar 78 and 79 being here adjustably mounted on the upper end portion of each rod 54 and 56, respectively, as by means of set screws or the like. Thus, the force of gravity normally maintains the rods 54 and 56 and the hold down assembly 49 in their full downward position as shown in FIG. 1 where collars 78 and 79 rest against the hangers 73 and 74, respectively, when the carriage assembly 41 is in its uppermost position in apparatus 12.

When and as carriage assembly 41 is moved downwardly to its lower position fruit holder assembly 49 moves towards a complementary upwardly facing fruit holder assembly 81 which has a semispherical segmental form similar in construction to that of segment 51. Segment 89 is provided with an aperture 82 similar to aperture 53 and aperture 82 is axially aligned with aperture 53 and with axis 26 so that the blade segment 13 can be extended therethrough. The segment 89 is fixed to a slat member 83, which is stationary during a single coring operation, as will be more fully explained hereinafter.

Fruit holders 81 and 49 are thus adapted to coact together to hold a fruit member therebetween with segments 89 and 49 thereof. As the carriage assembly 41 is moved downwardly, a spatial relationship between holders 81 and 49 is achieved where a fruit member 84 is grasped between segments 89 and 49. At this position the hold down assembly 49 and segment 51 no longer descend with carriage assembly 41. Now, the rods 54 and 56 remain stationary in space but slidably move upwardly, through the descending guides 76 and 77, respectively, so that, in effect, the rods 54 and 56 provide a means for achieving lost motion of the fruit holder assembly 49 relative to the carriage assembly 41, as those skilled in the art will appreciate, as is desired once the holders 81 and 82 have mounted about and grasped a fruit member. Rods 54 and 56 also coact with segment 51 and plate 52 to provide a stabilizing means preventing rotational movement of fruit member 84 as grasped between segments 51 and 89 when (subsequently) the rotating blade segment 13 is advanced through fruit member 84, as explained below.

As the carriage assembly 41 continues to descend the rotating blade segment 13 continues to reciprocally move downwardly, and is driven into and through the fruit member 84. The core (not detailed) of fruit member 84 is received into and retained within blade segment 13 adjacent the end 14 thereof. When the carriage 41 is in its lowermost position, the end 14 of blade segment 13 extends completely through fruit member 84 and segment 89, and, preferably, protrudes somewhat through slat 83 in a manner generally as shown, for example, in FIG. 3.

With the blade segment fully extended through the second holder assembly 81 and with the blade segment 13 rotating, pneumatic valve 86 is opened and a stream of compressed air is admitted to conduit 87 which connects via coupling assembly 93 with tube 88. Coupling assembly 93 is stationarily mounted to frame assembly 29 so that tube 88 is fixed. Tube 88 has an outer diameter such that it is adapted to slidably engage interiorly the walls of the channel 18 of driving segment 23, preferably sealingly. The compressed air stream is conveyed through the tube 88 into and through the passage extending through the of the interior blade assembly 11 so that core ejecting pressure is applied against the core in blade segment 13. Sufficient pressure is employed to expel the core from blade segment 13 downwardly out through the end 14.

After a core is so discharged from end 14, the carriage assembly 41 is moved upwardly and the blade segment 13 is withdrawn from the fruit member 84 and the coring operation cycle of blade assembly 11 is completed. As the carriage assembly 41 moves upwardly, the rods 54 and 56 slide in guides 76 and 77 until the respective collars 78 and 79 engage the region adjacent hangers 73 and 74. Continued upward movement of carriage assembly 41 causes the fruit hold down assembly 49 to be lifted away from the now cored fruit member 84.

Fruit member 84 may now be removed from segment 89 either manually or mechanically. In apparatus 12, a plurality of segments 89 are employed, each secured to a separate respective slat 83. The slats 83 are spatially located in a longitudinally spaced, parallel relationship to one another at regular intervals, and the opposed ends of each slat 83 are secured to a pair of transversely spaced, parallel endless drive chains 96 and 97. Each chain 96 and 97 is driven by a sprocket 98 and 99 which, in turn, are rotatably driven by a common shaft (not shown) which is itself rotatably turned by a sprocket 101. The combination of slats 83, chains 96 and 97, sprockets 98 and 99 and 101 and associated parts provide a conveyor assembly 102 which translates sequentially individual segments 89 into an aligned position with axis 26 during operation of apparatus 12. After an individual segment 89 reaches such an aligned position, movement of conveyor assembly 102 stops and a coring operation is carried out after which movement of conveyor assembly 102 occurs to advance the next segment 89 into a corresponding such aligned position. Individual fruit members 84 may be manually loaded with their individual cores generally vertically extending into each segment 89 in a region of conveyor assembly 102 which is moving horizontally towards alignment of segments 89 with axis 26. After a coring operation, cored fruit members may be dumped from each segment 89 into a bin or the like by passing the chains 96 and 97 over and around and downwardly over a guide sprocket arrangement in returning the conveyor assembly 102 and segments 89 for reloading with fruit members. In this way, apparatus 12 operates continuously to core fruit members.

The sequence of operations of an apparatus 12 can be controlled by any convenient means. For example, in apparatus 12, when the upper chamber of cylinder 46 has been filled with compressed air via conduit 103, and shaft 47 has been advanced to its lowermost predetermined position, carriage assembly 41 comes into engagement with microswitch 104 which is fixed to frame assembly 29. Closing of electrical microswitch 104 causes the operation of a conventional four way valve assembly 106 to which conduits 103 interconnect and results in reversably switching air pressure from upper conduit 103 to lower conduit 103 so that pressure in upper chamber of cylinder 46 is released and the lower chamber of cylinder 46 is pressured. An appropriate conventional time-delay circuit (not detailed) delays such operation of valve assembly 106 for a predetermined time interval during which a core is discharged from blade segment 13. Alternatively, the core discharge operation can be carried out, if desired, as when relatively slow operating speeds are used, without such a time delay.

Such closing of microswitch 104 causes the immediate operational opening of valve 86 and the pressurization interiorly of blade assembly 11, as explained, to remove a core therefrom. As discharged, cores can drop into a bin (not shown) or the like, as desired. After gas pressure through valve 86 has been applied for a desired predetermined interval of time, valve 86 is automatically returned to its normally closed state. The operationally open period of valve 86 can be regulated by a conventional time delay circuit (not detailed).

After a core has been so discharged and valve 86 closed, and after cylinder 46 has been operated to move carriage assembly 41 upwardly a sufficient distance from a segment 89 to disengage both end 14 and segment 51 from an individual fruit member 84, then motion of conveyor assembly 102 is initiated to move a cored fruit member away from alignment with axis 26 and to move a new fruit member into alignment with axis 26 for coring. Initiation of such movement of conveyor assembly 102 can be regulated by the passage of a predetermined interval of time after commencement of upward movement of shaft 47 as set using a conventional time delay circuit (not detailed). Mechanical cam means can be used alternatively to regulate blade assembly reciprocation relative to conveyor assembly movement.

A second microswitch 108 can be employed to operate valve assembly 106 when carriage assembly 41 has been moved to its predetermined uppermost position and thereby reverse pressures in conduits 103 so that downward movement of carriage assembly 41 is initiated, thereby completing one complete cycle of operation of apparatus 12.

Movement of conveyor assembly 102 is halted whenever a slat 83 strikes a microswitch 114 fixed to frame assembly 29, the striking position being adjusted to match axis of segment 89 with axis 26. Preferably, as a safety feature, downward movement of carriage assembly 41 does not commence until both microswitch 114 and microswitch 108 are closed.

An alternative means for core removal from blade segment 13 is illustrated in FIG. 5 for an alternative apparatus 12'. Here, components similar to those shown in FIGS. 1-4 are similarly numbered but with the addition of prime marks thereto. Tube 88 is replaced by a rod 109 which slidably engages the walls of the channel in driving segment 23' of blade assembly 11 and is also adapted to slide through channel 18 in bearing segment 16'. Operation of apparatus 12' is comparable to that of apparatus 12, except that, when end 14' of blade segment 13' has been extended through a fruit member 84' to a position as generally illustrated in FIG. 5, a double acting pneumatic cylinder 111 is actuated. Cylinder 111 is axially aligned with axis 26' and is fixed to frame assembly 29'. When actuated, shaft 112 of cylinder 111 moves ejector rod 109 downwardly coaxially with axis 26 interiorly of blade assembly 11'. The bottommost end 113 of rod 109 engages a core 112a in blade segment 13 and drives such core 112a from the blade segment 13 out through end 14'. When such end 113 has moved approximately to end 14', air flow in cylinder 111 is reversed so that shaft 112 is reversed as respects direction of movement, and rod 109 is moved upwardly to a predetermined location to complete a core removal cycle of operation.

If desired, apparatus of the present invention can be formed with a plurality of blade assemblies 11 mounted in a gang and operating so as to perform together a plurality of simultaneous coring operations upon a plurality of individual respective fruit members. In such an arrangement, the blade assemblies 11 may be transversely parallelly spaced from one another and the fruit members may be moved in rows longitudinally beneath such blade assemblies 11 using a plurality of rows of segments 89 mounted on a conveyor assembly.

Figure 6:
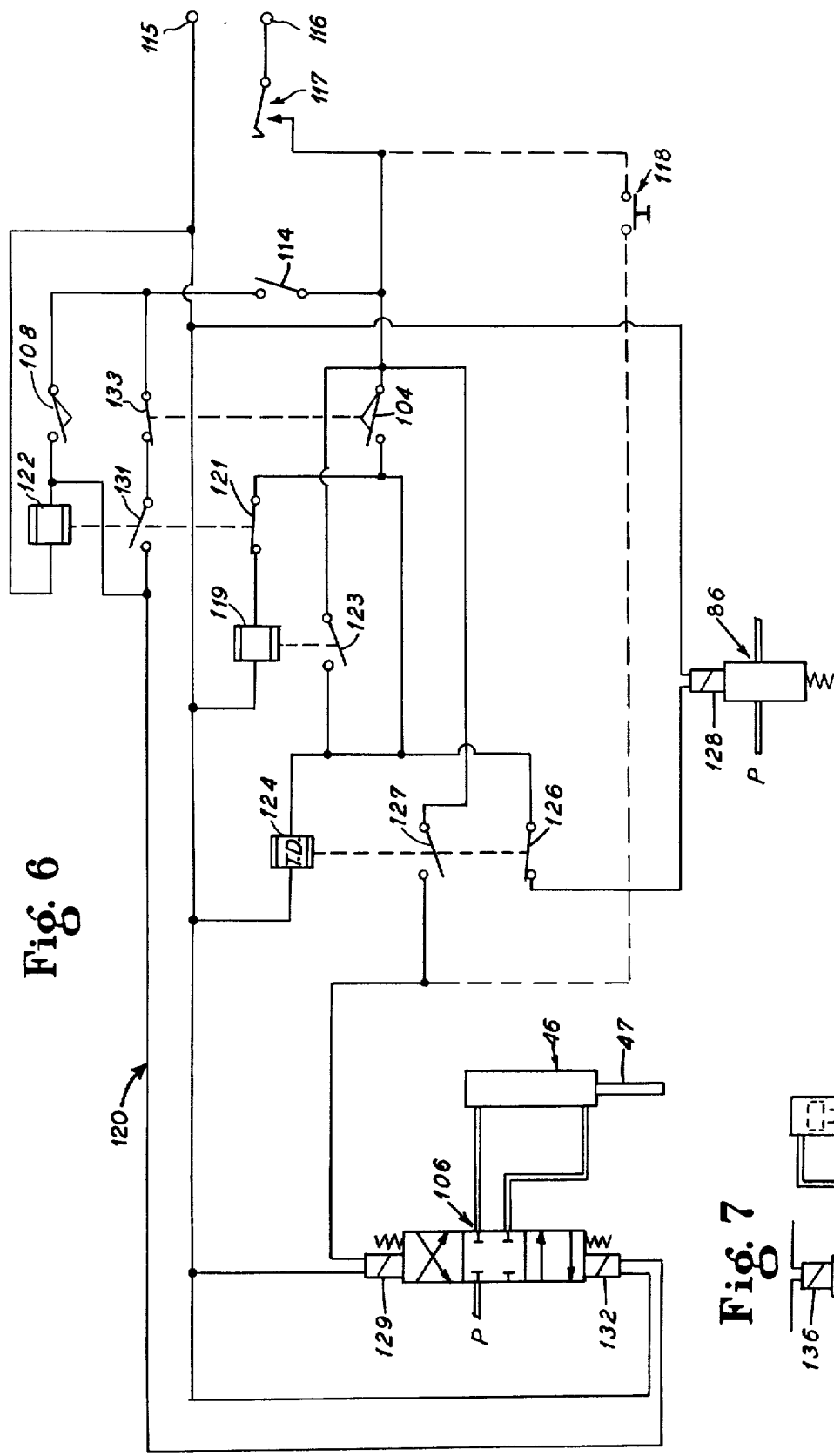
FIG. 6 shows an electrical schematic circuit diagram adapted for use in the operation of the embodiment shown in FIGS. 1 through 4.

Referring to FIG. 6, there is seen a negative polar line 115 and a positive polar line 116 from a conventional power source (not detailed) such as 110 volt A.C. Lines 115 and 116 power circuit 120. A conventional typical start switch 117, when closed, starts operation of embodiment 11. Switch 117 is here of the self-locking type whereby once closed, it remains engaged (closed).

An intermediate position start up switch 118 is provided also. Thus, if machine 12 is shut down at a time when the carriage assembly 41 is in an intermediate position, machine 12 is started by closing switch 118 momentarily for a time sufficient to cause frame assembly 29 to move to the end of its cycle. At this location, the automatic operation takes over and the machine 12 fully cycles back and forth thereafter with switch 117 closed.

When carriage assembly 41 has moved to its bottom position and switch 117 is closed (on), the limit switch 104 is closed by the carriage assembly 41. The circuit pathway activated by the closing of limit switch 104 remains active only while the carriage assembly 41 stays down; however, such activation energizes the coil of relay 119 through a normally closed contact switch 121 which switch 121 is part of another relay 122. From the coil of relay 119 such circuit pathway is completed back to line 115. Energizing the coil of relay 119 closes the associated normally open switch 123. When switch 123 is closed, the coil of relay 119 remains energized after limit switch 104 is opened when carriage assembly 41 again moves upwards.

When switch 123 is closed, the coil of time delay relay 124 becomes activatable. Thus, after switch 123 is closed, relay 124 remains in the configuration shown for a predetermined, desired period of time during which normally closed switch 126 remains closed and normally open switch 127 remains open, switches 126 and 127 being associated functionally with relay 124.

When switch 126 is closed and switch 123 is closed, solenoid operated valve 86 is energized, and compressed gas (e.g. air) can pass through conduit 87, as explained.

After the preset time delay period, relay 124 becomes activated, and switch 127 closes while switch 126 opens. When switch 126 opens, solenoid operated valve 86 closes through deactivation of solenoid 128 thereof. Also, when switch 127 closes, solenoid 129 of the four way valve 106 is activated which results in operating the cylinder 46 so that shaft 47 is axially withdrawn thereinto so that carriage assembly 41 is moved upwards. As soon as the carriage assembly 41 moves up, it moves away from the limit switch 104 and the limit switch 104 opens but relay 119 remains active and switch 123 remains closed, as indicated. The time delay period is adjusted so that valve 86 is not cut off until core removal has been completed with blade end 14 extending through the fruit member 84, and carriage assembly 41 does not move upwards until core removal has been completed, as indicated. As soon as solenoid 128 is de-energized, valve 86 closes. Valve 86 is preferably spring biased to a normally closed position. When the solenoid 129 of valve 106 is energized, the carriage assembly 41 moves upward from the configuration shown in FIG. 3 until the configuration shown in FIG. 1 is achieved where the upper limit switch 108 is closed. When such switch 108 closes a new set of circumstances takes place. Switch 108 is closed as long as carriage assembly 41 is against it. When switch 108 is closed, and switch 114 is also closed, the coil of relay 122 is energized which opens normally closed switch 121 and closes normally open switch 131 (the switch 131, like switch 121, being functionally associated with relay 122). As a result, relay 119 is de-energized, switch 123 is opened, and the relay 119 and its associated circuit elements return to a neutral configuration. Preferably relay 119 is spring biased towards such a neutral position.

With switch 131 closed, a holding circuit is activated for relay 122 which effectively bypasses switch 108. Thus, when switch 108 is opened as the carriage assembly moves away therefrom downwardly, relay 122 remains active and energized. With switch 123 opened by inactivation of relay 119, relay 124 is de-energized causing switch 127 to open, thereby deactivating solenoid 129. However, with switch 131 closed, the other solenoid 132 of the valve 106 is energized, thereby causing valve 106 to reverse and to supply pressurized air to cylinder 46 so as to advance shaft 47 and move carriage assembly 41 downwards which is continues to do until limit switch 104 is again contacted by carriage assembly 41. Closing of switch 104 opens normally closed switch 133 which deactivates solenoid 132 as desired at this time in machine 11 operation. Thus, an entire cycle of operation is achieved automatically.

Those skilled in the art will appreciate that adjustable speed factors can be, in effect, built into the system regulating such variables as machine cycle time.

Figure 7:
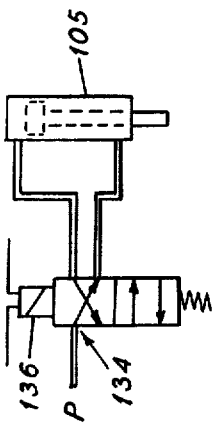
FIG. 7 illustrates a detail view of a solenoid actuated 4-way valve of a type suitable for use in combination with the circuit of FIG. 6 for the embodiment illustrated in FIG. 5.

The circuit 120 is also suitable for the automatic operation of the apparatus embodiment 12' shown in FIG. 5. Thus, in circuit 120 of FIG. 6, one substitutes for valve 86, the four way solenoid valve 134 shown diagrammatically in FIG. 7. When solenoid 136 of valve 134 is actuated (energized) with switch 126 closed, as explained above, during machine 12' cycling, then pneumatic cylinder 111 is supplied with compressed gas (e.g. air) so as to extend its shaft 112 and move the rod 109 downwardly coaxially with axis 26' to drive a core 112 out of blade segment 13. When, as machine 12' cycles, and circuit 120 operates, switch 126 is subsequently opened after a time delay, then the spring biasing of valve 134 causes an immediate valve flow reversal so that valve 134 then causes retraction of shaft 112 (and rod 109).

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth in the hereto-appended claims.

I claim:
1. A coring apparatus for fruit and the like comprising
(A) a rigid upright supporting frame assembly,
(B) a vertical blade assembly including
   (1) a vertical blade segment in the form of an elongated tubular member with uniform relatively thin side walls and having a lower end cross sectionally circular cutting edge,
   (2) a bearing segment in the form of a cylindrical member having a channel axially defined therethrough and further having annular radial and thrust bearing surfaces defined on circumferentially outer surfaces thereof,
   (3) connection means joining said blade and bearing segments together in fixed but inseparable, end-to-end coaxial, corotational interrelationship,
   (4) and a driving segment in the form of an upwardly extending substantially elongated tubular extension from said bearing segment and having a lower end coaxially and corotatively connected to said bearing segment,
   (5) said segments and extension providng a continuous passage therethrough opening at the lower end through said cutting edge;
(C) bearing means fixed to an upper portion of said frame assembly and mounting said driving segment for rotational and reciprocal movements of said blade assembly relative to said frame assembly;
(D) first drive means functionally associated with said driving segment for rotating said blade assembly, said first drive means including a power head and power transfer means interconnecting said power head with said driving segment;
(E) a carriage assembly vertically reciprocally mounted to said frame assembly and adapted to make reciprocal movements relative thereto in a plane parallel to the axis defined by said blade assembly, including bearing means for said reciprocal movements;
(F) thrust type bearing means fixed to said carriage assembly and rotatably mounting said bearing segment at said bearing surfaces thereof for drivably vertically reciprocally moving said blade assembly while the blade assembly is continuously rotated by said first drive means;
(G) second drive means comprising rectilinear fluid cylinder actuator means having relatively reciprocable parts one of which parts is mounted in fixed position on said frame assembly and the other of which parts is functionally attached to said carriage assembly for reciprocating said carriage between an upper and a lower position relative to said frame assembly in the relative reciprocation of said parts, said actuator being oriented on a vertical operating axis substantially parallel to the axis of said blade assembly;
(H) fruit supporting means associated with said frame assembly spaced below said blade assembly, said fruit supporting means being adapted to support a fruit member in a fixed core removal position alligned in normally spaced relation under said cutting edge, and having a coaxial clearance aperture for passing therethrough of said blade segment;
(I) fruit hold down means in circumferentially adjacent clearance relationship to the outer side of said blade segment and in cooperative allignment with said supply means and including a pair of arms supporting said hold down means in suspended relation from said carriage assembly in non-rotatable orientation relative to said blade assembly so that said hold down means will move with said carriage and said blade assembly into and out of engagement with a fruit supported on said supporting means in position to be cored by said blade segment, said arms including lost motion means connecting said arms to said carriage and permitting said blade assembly to advance independently of said fruit hold down means after said fruit hold down means has engaged a fruit to be cored, said lost motion means through said arms holding said hold down means against rotation;
(J) said fruit supporting means and said fruit hold down means being adapted to cooperate in axially spaced relationship to one another with a fruit to be cored held by and between them during advance of said blade assembly by downward movement of said carriage to said lower position as effected by said second drive means to drive the rotating blade segment cutting edge through said hold down means and said fruit and said supporting means whereby to cut the core from said fruit;

(K) drive regulation means for cyclically operating said second drive means for reciprocating said carriage and said blade assembly;

(L) core ejector means for applying downwardly exertable pressure through said passage of said blade assembly toward said cutting edge; and (M) pressure regulation means for cyclically operating said core removal means in coordinated relation with coring operations of said blade assembly.

2. The coring apparatus of claim 1 further including control means for controlling said drive regulation means and thereby causing said coring apparatus to automatically operate through successive full machine cycles continuously, each one of said full cycles of machine operation comprising progressively (A) first operating said drive regulation means to cause said second drive means to lower said carriage assembly to said lower position, then (B) secondly operating said pressure regulation means to pressurize said core removal means, and then (C) thirdly operating said drive regulation means to cause said second drive means to raise said caraige assembly to said upper position, said first drive means being continuously operating during all such full cycles of machine operation.

3. The coring apparatus of claim 1 wherein said core ejection means comprises a rod slidably coaxially moveable in said blade assembly and third drive means including fluid cylinder actuator means functionally associated therewith for reciprocating said rod relative to said blade assembly.

4. The coring apparatus of claim 3 further including control means for controlling said drive regulation means and thereby causing said coring apparatus to automatically operate through successive full machine cycles continuously, each one of said full cycles of machine operation comprising progressively (A) first operating said drive regulation means to cause said second drive means to lower said carriage assembly to said lower position, then (B) secondly operating said pressure regulation means to pressurize said core removal means, and then (C) thirdly operating said drive regulation means to cause said second drive means to raise said carriage assembly to said upper position, said first drive means being continuously operating during all such full cycles of machine operation.

5. A coring apparatus according to claim 1 wherein said core ejector means comprises a means for selectively introducing air under pressure into said blade assembly passage at the end of a coring operation whereby to force the core from said blade segment.

6. A coring apparatus according to claim 5, further including control means for controlling said drive regulation means and thereby causing said coring apparatus to automatically operate through successive full machine cycles continuously, each one of said full cycles of machine operation comprising progressively (A) first operating said drive regulation means to cause said second drive means to lower said carriage assembly to said lower position, then (B) secondly operating said pressure regulation means to pressurize said core removal. means, and then (C) thirdly operating said drive regulation means to cause said second drive means to raise said carriage assembly to said upper position, said first drive means being continuously operating during all such full cycles of machine operation.

* * * * *